United States Patent
Ukaji et al.

(10) Patent No.: US 11,811,282 B2
(45) Date of Patent: Nov. 7, 2023

(54) COIL DEVICE HAVING A CORE WITH PLATE SHAPED COIL BODIES

(71) Applicant: Panasonic Intellectual Property Management Co., Ltd., Osaka (JP)

(72) Inventors: Hajime Ukaji, Hyogo (JP); Mitsuoki Hishida, Osaka (JP); Kiyomi Kawamura, Osaka (JP); Toshiyuki Tamamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 185 days.

(21) Appl. No.: 17/285,457

(22) PCT Filed: Oct. 17, 2019

(86) PCT No.: PCT/JP2019/040947
§ 371 (c)(1),
(2) Date: Apr. 14, 2021

(87) PCT Pub. No.: WO2020/080479
PCT Pub. Date: Apr. 23, 2020

(65) Prior Publication Data
US 2021/0344242 A1    Nov. 4, 2021

(30) Foreign Application Priority Data
Oct. 18, 2018 (JP) ................................ 2018-196585

(51) Int. Cl.
*H02K 3/04* (2006.01)
*H02K 1/12* (2006.01)
(Continued)

(52) U.S. Cl.
CPC ................ *H02K 3/04* (2013.01); *H02K 1/12* (2013.01); *H02K 3/12* (2013.01); *H02K 3/28* (2013.01)

(58) Field of Classification Search
CPC .. H02K 1/00; H02K 1/12; H02K 3/00; H02K 3/04; H02K 3/12; H02K 3/28; H02K 3/38
(Continued)

(56) References Cited

U.S. PATENT DOCUMENTS

2021/0249924 A1* 8/2021 Tamamura ............. H02K 21/16
2021/0344246 A1* 11/2021 Ukaji ....................... H02K 3/18
(Continued)

FOREIGN PATENT DOCUMENTS

DE    102012212637 A1    1/2014
JP    H10-201187 A    7/1998
(Continued)

OTHER PUBLICATIONS

Tsuboi et al., English Machine Translation of JP H11-027886 (Year: 1999).*

(Continued)

*Primary Examiner* — Rashad H Johnson
(74) *Attorney, Agent, or Firm* — McDermott Will & Emery LLP

(57) ABSTRACT

A coil device includes a first coil including a plate-shaped first coil body having a first and second end. The first coil body is spirally wound on a columnar portion along the extending direction of the columnar portion such that the second end is positioned on one side in the extending direction relative to the first end. The coil device further includes a second coil including a plate-shaped second coil body having a third end and a fourth end. The second coil body is spirally wound on the columnar portion along the extending direction such that the third end is positioned on the one side in the extending direction relative to the second end of the first coil, and the fourth end is positioned on the one side in the extending direction relative to the third end. The second coil is in electrically parallel connection with the first coil.

5 Claims, 14 Drawing Sheets

(51) Int. Cl.
*H02K 3/12* (2006.01)
*H02K 3/28* (2006.01)

(58) Field of Classification Search
USPC ........ 310/179, 181, 184, 189, 198, 201, 208
See application file for complete search history.

(56) References Cited

U.S. PATENT DOCUMENTS

| | | | |
|---|---|---|---|
| 2021/0359566 A1* | 11/2021 | Nukada | H02K 3/28 |
| 2022/0224180 A1* | 7/2022 | Hongo | H02K 3/28 |
| 2022/0255386 A1* | 8/2022 | Hijikata | H02K 3/12 |
| 2022/0320932 A1* | 10/2022 | Sakaguchi | H02K 3/28 |

FOREIGN PATENT DOCUMENTS

| | | |
|---|---|---|
| JP | H11-27886 A | 1/1999 |
| JP | 2008-92654 A | 4/2008 |
| JP | 2009-254001 A | 10/2009 |
| JP | 2013-102680 A | 5/2013 |
| JP | 2013-165566 A | 8/2013 |

OTHER PUBLICATIONS

Nomura et al., English Machine Translation of JP 2013-102680 (Year: 2013).*
Extended European Search Report issued in corresponding European Patent Application No. 19874249.6, dated Nov. 9, 2021.
International Search Report issued in corresponding International Patent Application No. PCT/JP2019/040947, dated Dec. 17, 2019, with English translation.

* cited by examiner

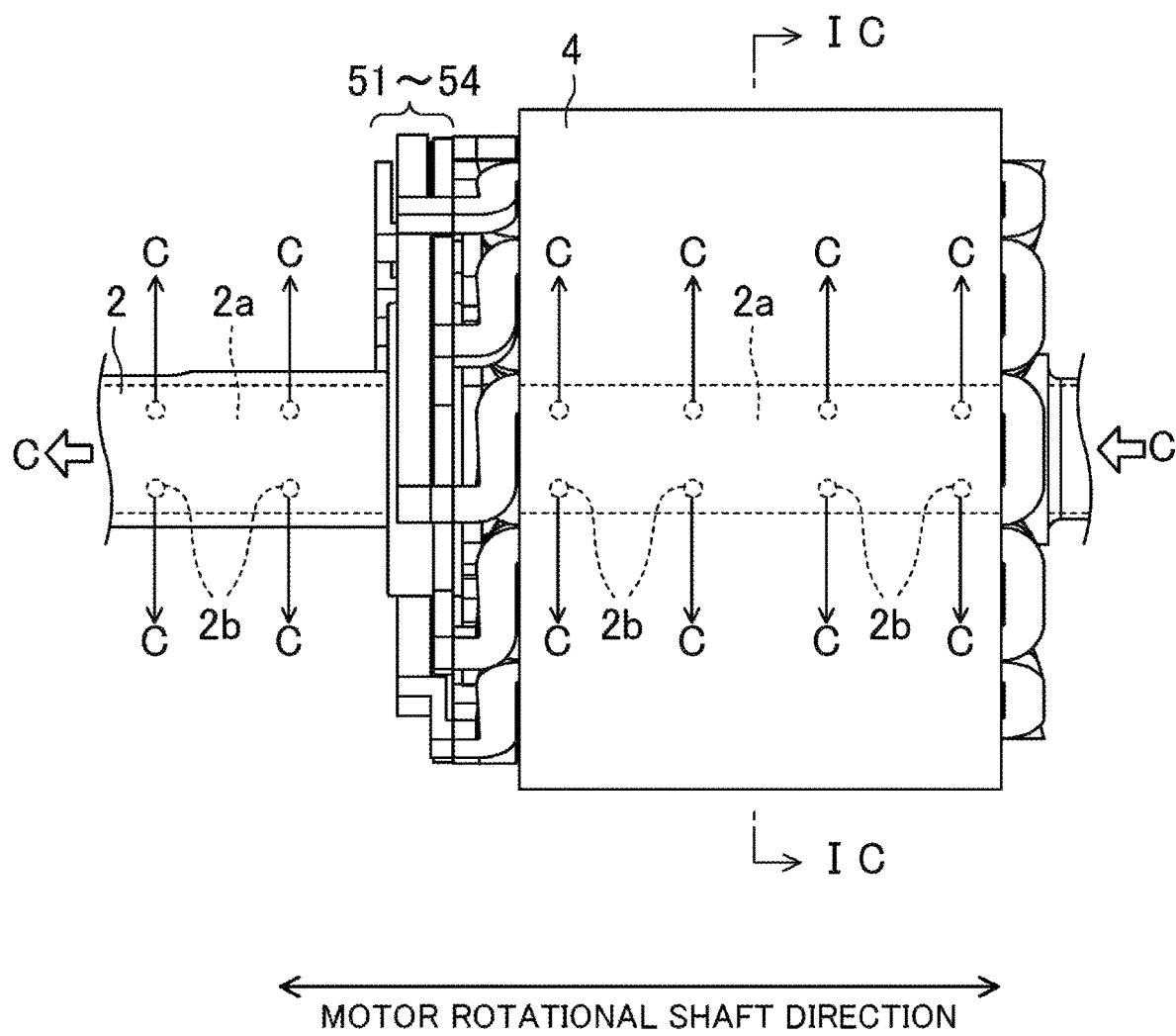

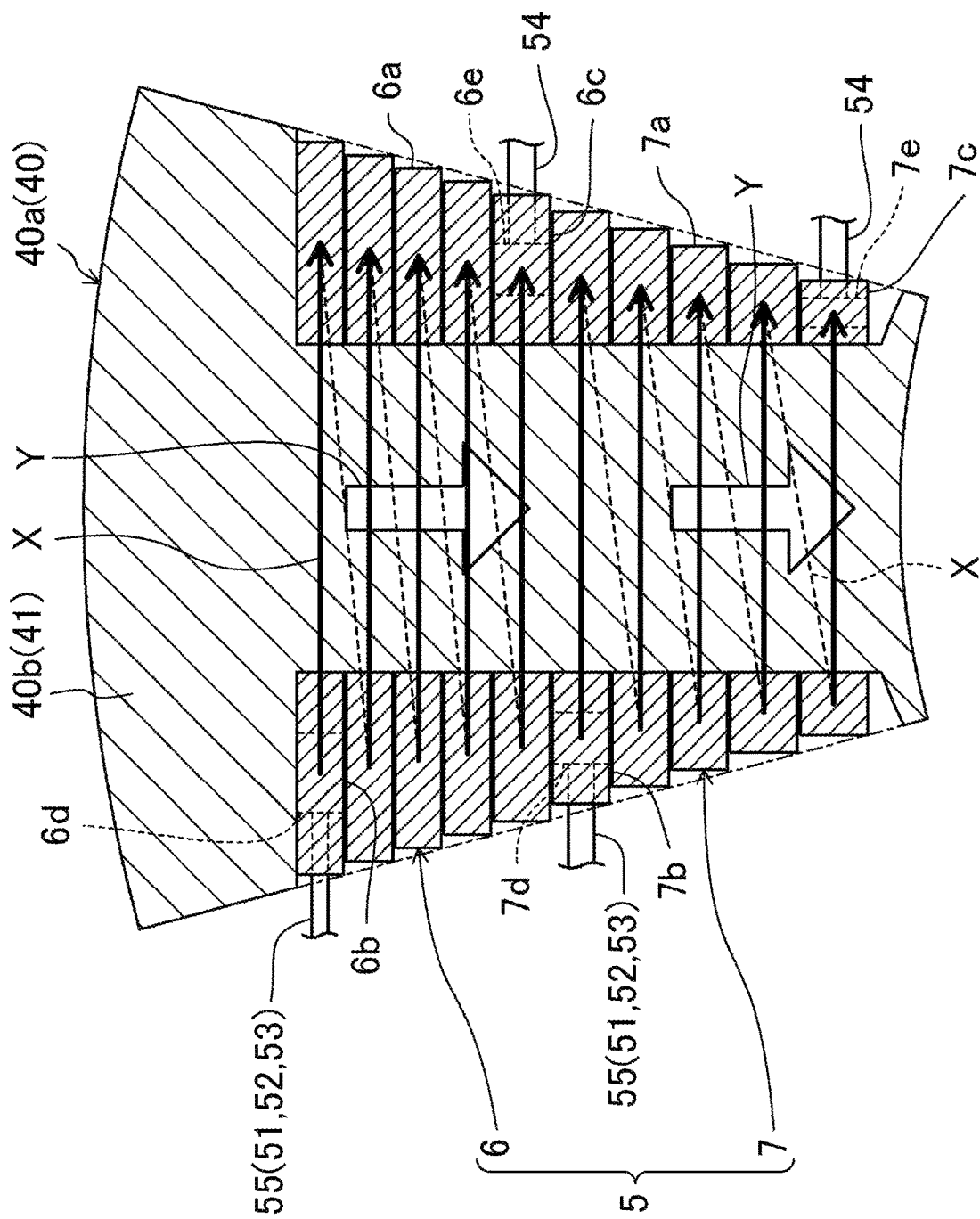

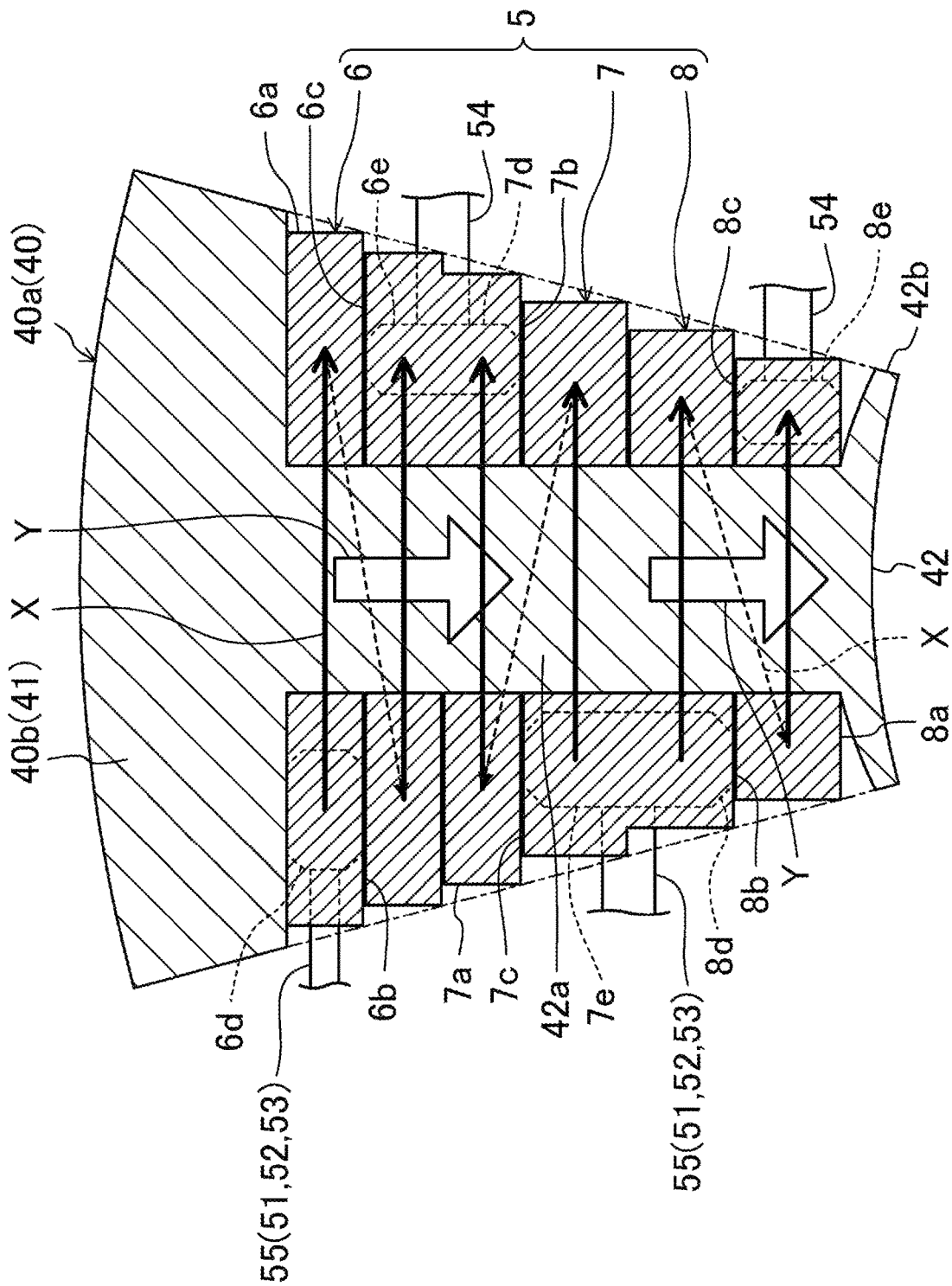

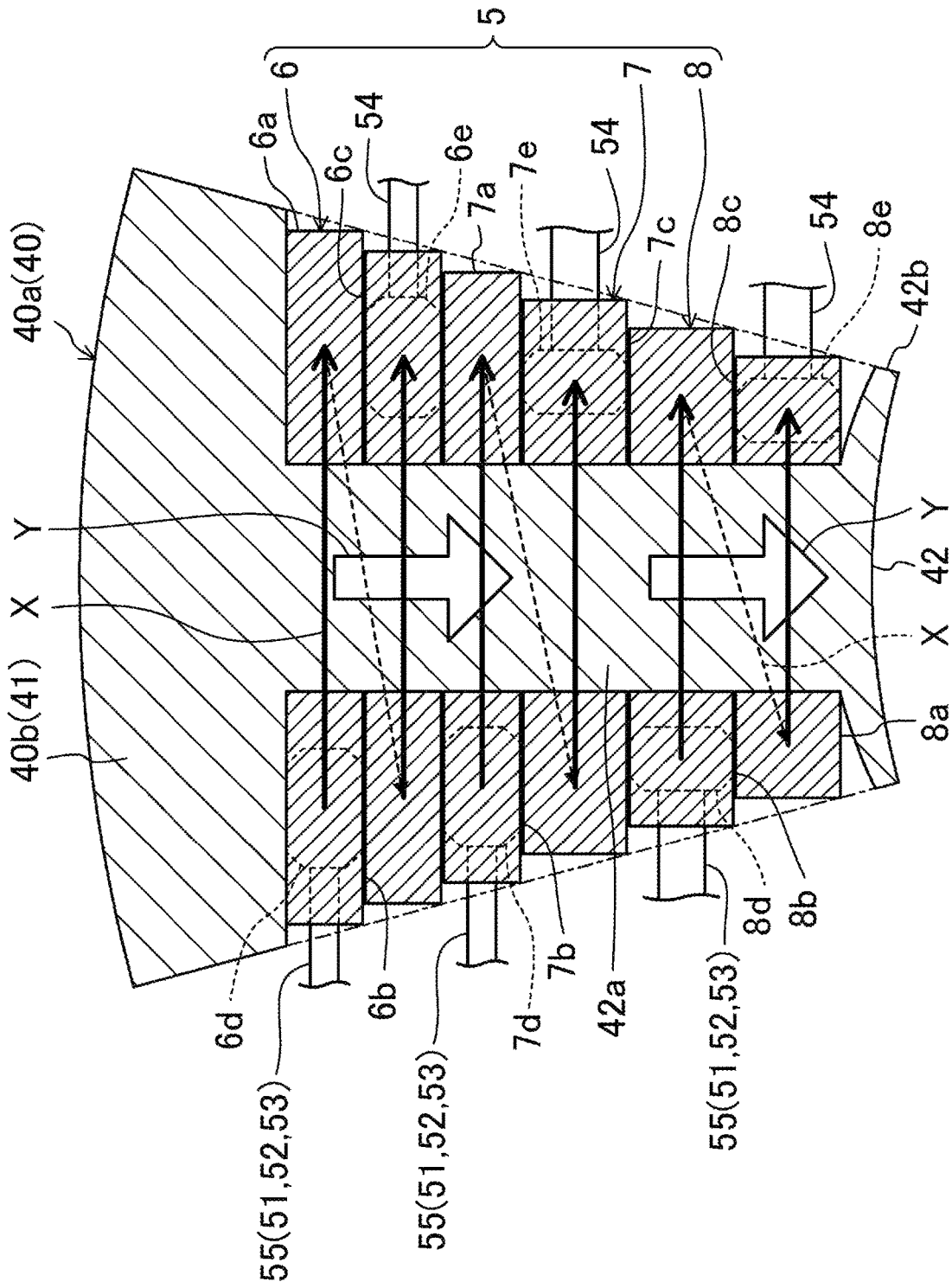

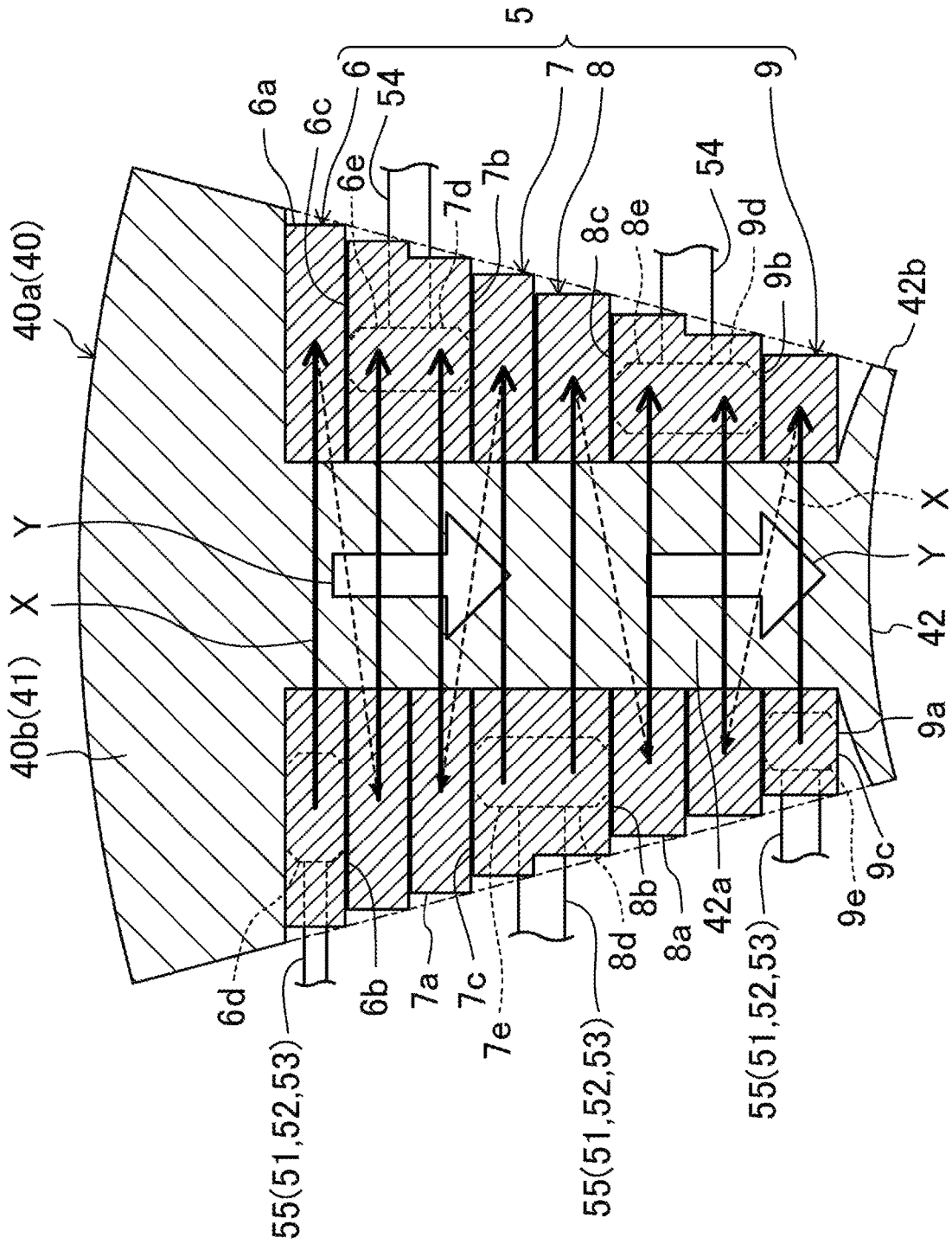

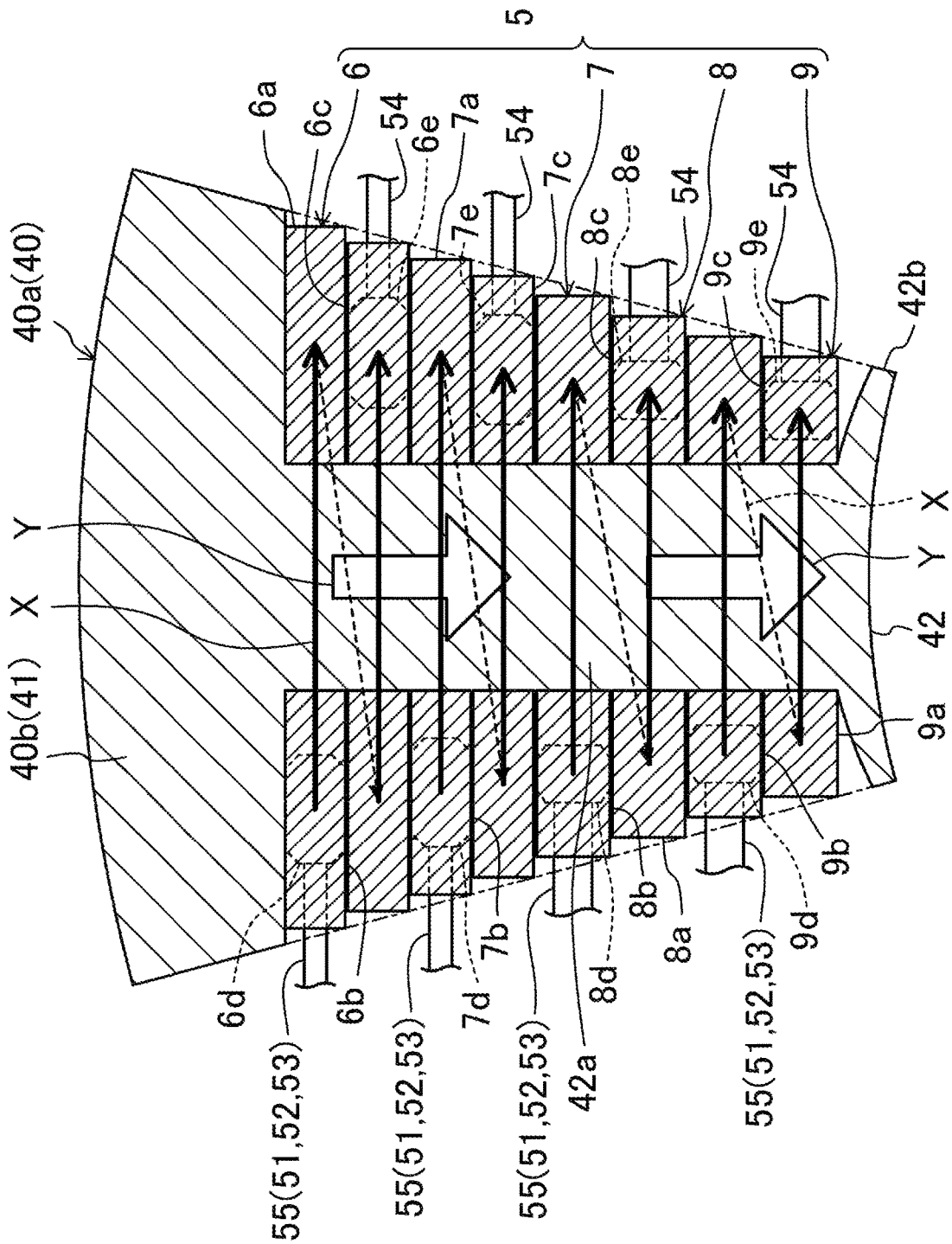

COIL DEVICE HAVING A CORE WITH PLATE SHAPED COIL BODIES

CROSS-REFERENCE OF RELATED APPLICATIONS

This application is the U.S. National Phase under 35 U.S.C. § 371 of International Patent Application No. PCT/JP2019/040947, filed on Oct. 17, 2019, which in turn claims the benefit of Japanese Application No. 2018-196585, filed on Oct. 18, 2018, the entire disclosures of which Applications are incorporated by reference herein.

TECHNICAL FIELD

The present invention relates to a coil device including a core having a columnar portion and a coil having a plate-shaped coil body being spirally wound on the columnar portion of the core.

BACKGROUND ART

Patent Document 1 discloses a coil device including a core having a columnar portion and a plate-shaped coil being spirally wound on the columnar portion of the core.

CITATION LIST

Patent Document

Patent Document 1: German Patent Application Publication No. 102012212637

SUMMARY OF THE INVENTION

Technical Problem

In a typical coil device such as that disclosed in Patent Document 1, it has been necessary to make a plate material constituting the coil in a limited space thicker to increase the allowable amount of current flowing through the coil device (that is, the current-carrying capacity of the coil device). Therefore, it has been difficult to increase the current-carrying capacity of the typical coil device.

In view of the foregoing background, it is therefore an object of the present invention to increase the current-carrying capacity of the coil device.

Solution to the Problem

In order to achieve the above objective, the technique disclosed herein provides a coil device including a core having a columnar portion extending in a predetermined extending direction; a first coil including a plate-shaped first coil body having a first end and a second end, the first coil body being spirally wound on the columnar portion of the core along the extending direction such that the second end is positioned on one side in the extending direction relative to the first end; and a second coil including a plate-shaped second coil body having a third end and a fourth end, the second coil body being spirally wound on the columnar portion of the core along the extending direction such that the third end is positioned on the one side in the extending direction relative to the second end of the first coil, and the fourth end is positioned on the one side in the extending direction relative to the third end, the second coil being in electrically parallel connection with the first coil.

Advantages of the Invention

According to the present disclosure, a current may be divided to flow through the first and second coils that are in electrically parallel connection. This enables an increase in the current-carrying capacity of the coil device, as compared to the case in which only one coil is wound on the core. That is, the present invention enables an increase in the current-carrying capacity of the coil device.

BRIEF DESCRIPTION OF THE DRAWINGS

FIG. 1B is a side view of the motor shown as the coil device of the first embodiment.

FIG. 8 is a cross-sectional view taken along line VIII-VIII in FIG. 7.

FIG. 9 corresponds to FIG. 4 and illustrates a third embodiment.

FIG. 10 corresponds to FIG. 8 and illustrates a fourth embodiment.

FIG. 11 corresponds to FIG. 9 and illustrates a fifth embodiment.

FIG. 12 corresponds to FIG. 10 and illustrates a sixth embodiment.

DESCRIPTION OF EMBODIMENTS

Embodiments of the present invention will be described below with reference to the drawings.

First Embodiment

One of the embodiments of the present invention will be described below with reference to the drawings.

Figure 1A:
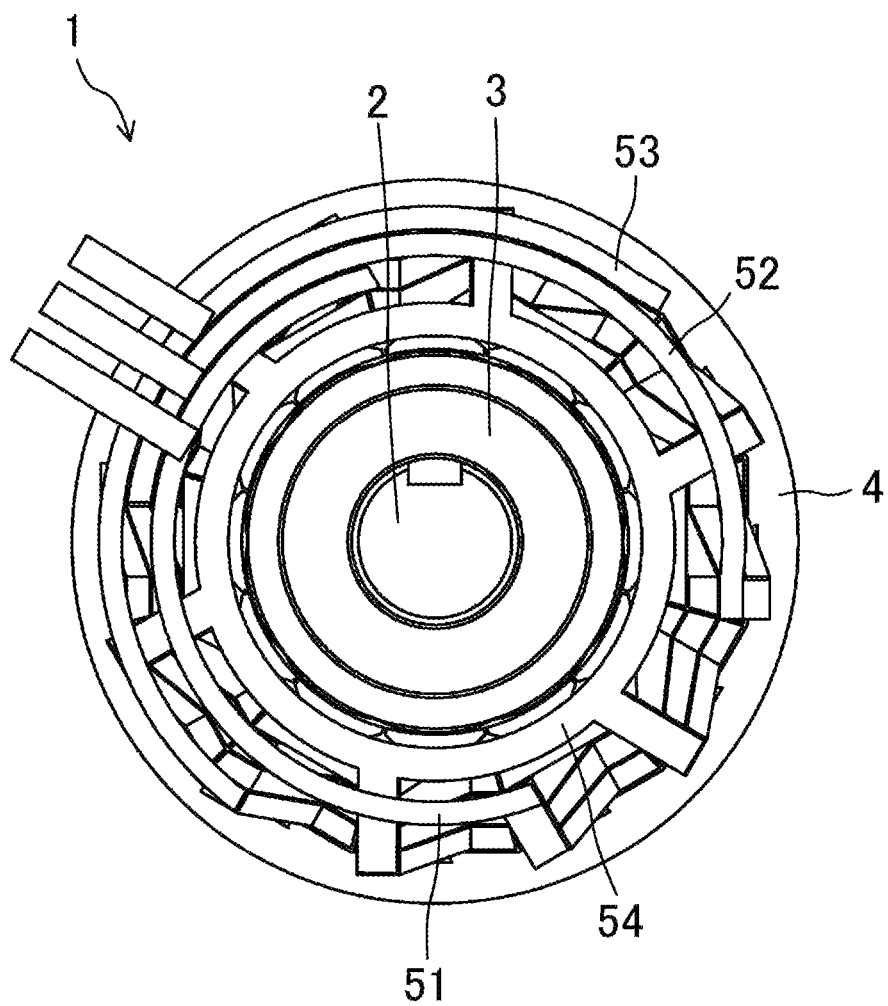
FIG. 1A is a plan view of a motor shown as a coil device of a first embodiment.
Figure 1C:
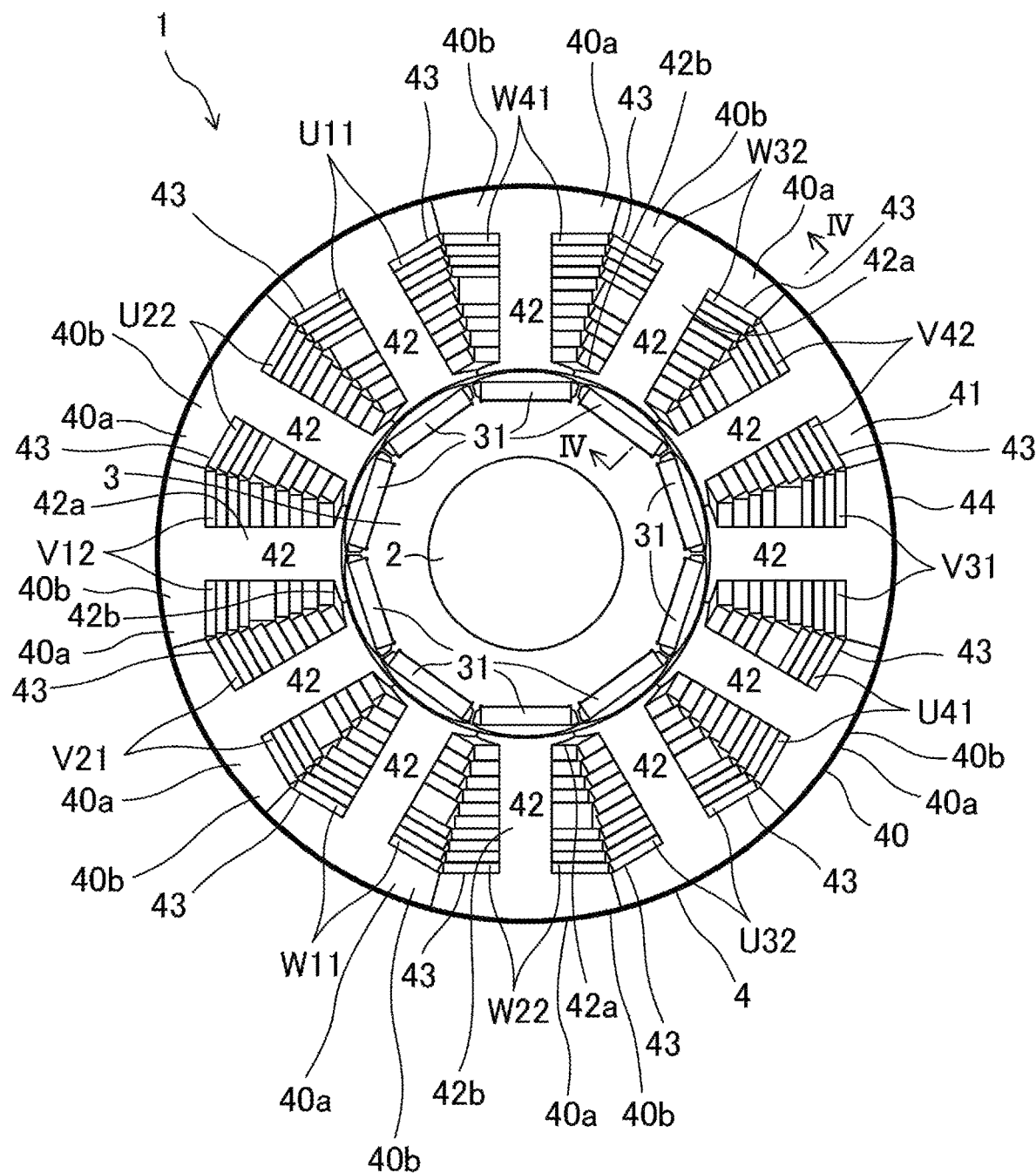
FIG. 1C is a cross-sectional view taken along line IC-IC in FIG. 1B.

FIGS. 1A to 1C are a top view, a side view, and a cross-sectional view, respectively, of a motor 1 shown as a coil device of a first embodiment of the present invention. However, none of the drawings illustrates a cover case and the like. The motor 1 includes a shaft 2, a rotor 3, a stator 4, coils U11 to W41, and bus bars 51 to 54 shown as first and second conductors, inside the cover case (not shown). Note that the direction perpendicular to each of the planes in FIGS. 1A and 1C is the motor rotational shaft direction.

The shaft 2 has a hollow portion 2a extending in the motor rotational shaft direction, and a side surface having a plurality of through holes 2b. The hollow portion 2a is a passage which allows a refrigerant C to pass therethrough to cool the inside of the motor 1. The refrigerant C flows through the hollow portion 2a in the motor rotational shaft direction (the longitudinal direction of the shaft 2) and circulates inside the motor 1. Further, part of the refrigerant C flowing through the hollow portion 2a flows out from the plurality of through holes 2b and flows from a center portion of the motor 1 toward its outside, that is, from the rotor 3 toward the stator 4, thereby cooling the rotor 3 and the stator 4.

The rotor 3 is in contact with the outer circumference of the shaft 2, and includes magnets 31, 31, . . . facing the stator 4, with N and S poles arranged alternately along the outer circumference of the shaft 2. The magnets 31 used in the rotor 3 are neodymium magnets in the first embodiment. However, the materials, shapes, and characteristics of the magnets may be changed as appropriate in accordance with the output of the motor 1, for example.

Figure 2:
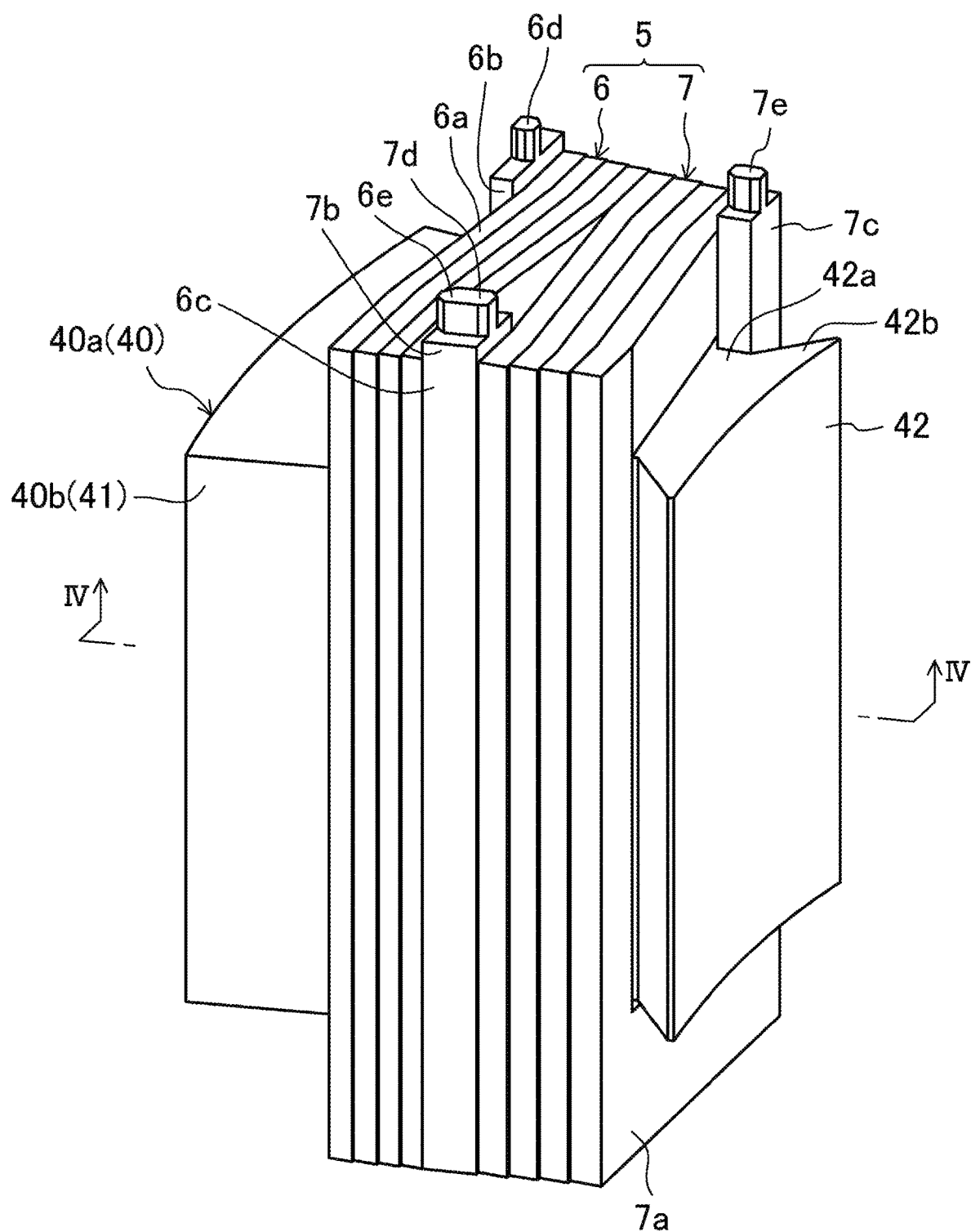
FIG. 2 is a perspective view of a coil set mounted on a divided core.
Figure 4:
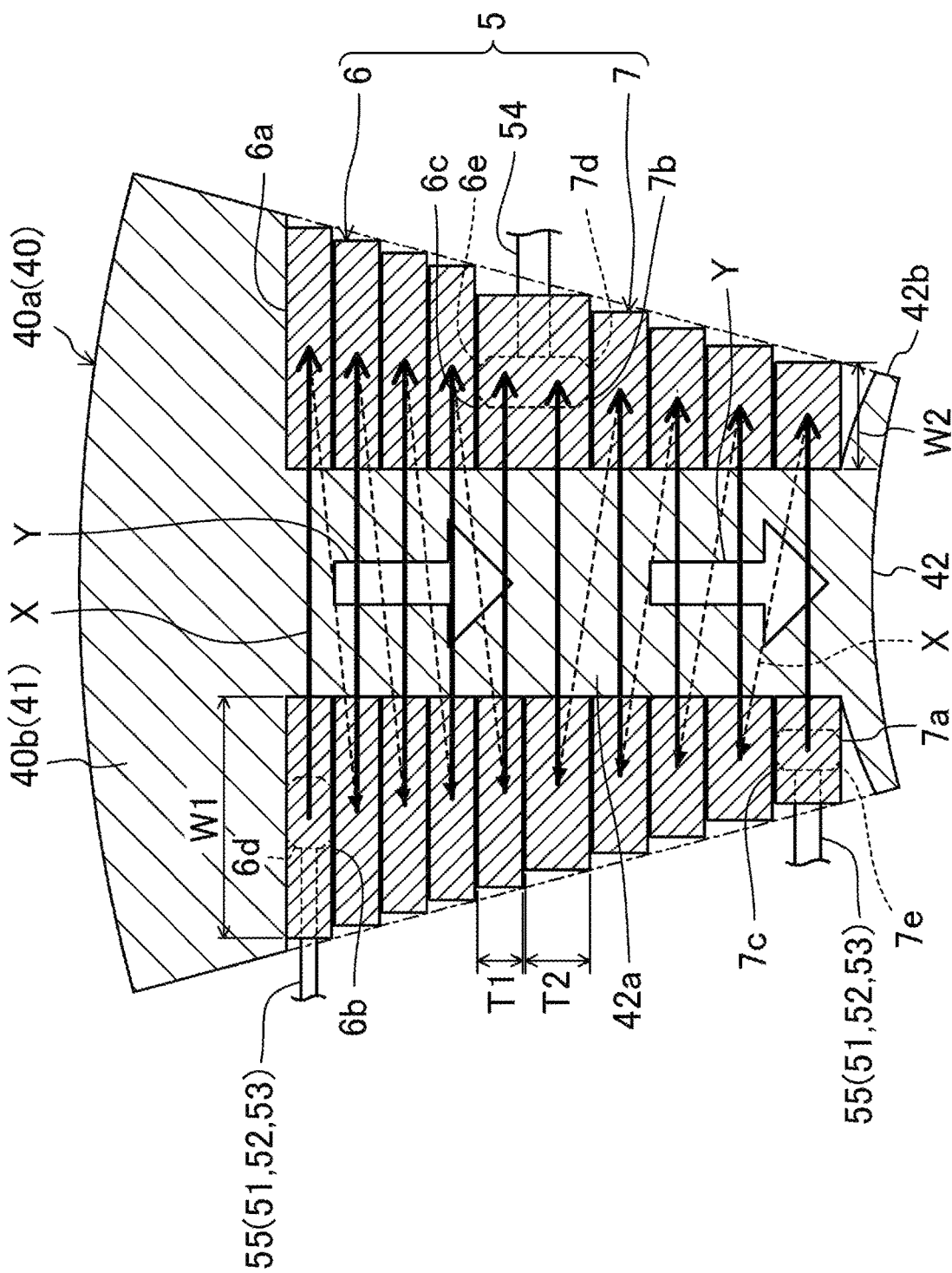
FIG. 4 is a cross-sectional view taken along line IV-IV in FIG. 2.

The stator 4 includes a stator core 40 comprised of twelve divided cores 40a shown in FIGS. 2 and 4. The twelve divided cores 40a are arranged around the rotational shaft of the motor 1 to form the stator core 40. Each of the divided cores 40a includes a substantially plate-shaped divided yoke 40b constituting a substantially annular yoke 41. The outer circumferential surface of the divided yoke 40b is curved in an arc shape centered at the rotational shaft of the motor 1. The inner circumferential surface of the divided yoke 40b is flat such that the divided yoke 40b is the thickest at the middle in the circumferential direction of the rotation of the motor 1 (hereinafter referred to as the motor rotation circumferential direction). A middle portion of the inner circumferential surface of the divided yoke 40b in the motor rotation circumferential direction is provided with a tooth 42 protruding entirely toward the rotation center of the motor 1 in the motor rotational shaft direction. The tooth 42 includes a columnar portion 42a having a quadrangular cross section and protruding from the inner circumferential surface of the divided yoke 40b, and an overhanging portion 42b positioned at an end of the columnar portion 42a and overhanging from the columnar portion 42a toward both sides in the motor rotation circumferential direction. Specifically, a portion of the tooth 42 excluding the end portion forms a columnar portion 42a extending in a predetermined extending direction. The divided cores 40a are coupled to each other by fitting a ring-shaped holding member 44 onto the outer circumferential sides of the divided yokes 40b. Therefore, the teeth 42 are arranged at equal intervals in the inner circumferential surface of the yoke 41. The columnar portion 42a of each of the teeth 42 has a pair of surfaces, which constitute the outer circumferential surface of the tooth 42, facing in the motor rotational shaft direction, and a remaining pair of surfaces facing in the motor rotation circumferential direction. Slots 43, 43, . . . are provided between the teeth 42, 42, . . . . The stator 4 is disposed on an outer side of the rotor 3 at a fixed distance from the rotor 3 when viewed from the rotational shaft of the motor 1. The stator core 40 is formed from a laminate obtained by stacking a plurality of core sheets made from electromagnetic steel sheets containing, for example, silicon, in the motor rotational shaft direction.

In the present embodiment, the number of magnetic poles of the rotor 3 is ten in total: five N poles and five S poles facing the stator 4, whereas the number of slots 43 is twelve. The numbers are not limited thereto and other number combinations of the magnetic poles and slots are also applicable.

The stator 4 includes twelve coil sets U11 to W41, which are mounted on the teeth 42, 42, . . . and are disposed in the slots 43, 43, . . . as viewed from the motor rotational shaft direction. Further, the coil sets U11 to U41 are being integrated by welding with the bus bar 51, the coil sets V12 to V42 are being integrated by welding with the bus bar 52, and the coil sets W11 to W41 are being integrated by welding with the bus bar 53.

Here, each of the coil sets is represented by reference characters UXY, VXY, or WXY. In these reference characters, the first character represents a phase (U-phase, V-phase, and W-phase in the first embodiment) of the motor 1, and the second character represents the order in which coil sets in the same phase are arranged. The third character indicates the direction of the magnetic field. The direction of the generated magnetic field of the coil set whose third character is 1 is opposite to that of the coil set whose third character is 2. Hereinafter, each of the coil sets whose third character is 1, that is, U11, U41, V21, V41, W11, and W41 is referred to as a coil set 5.

Figure 3:
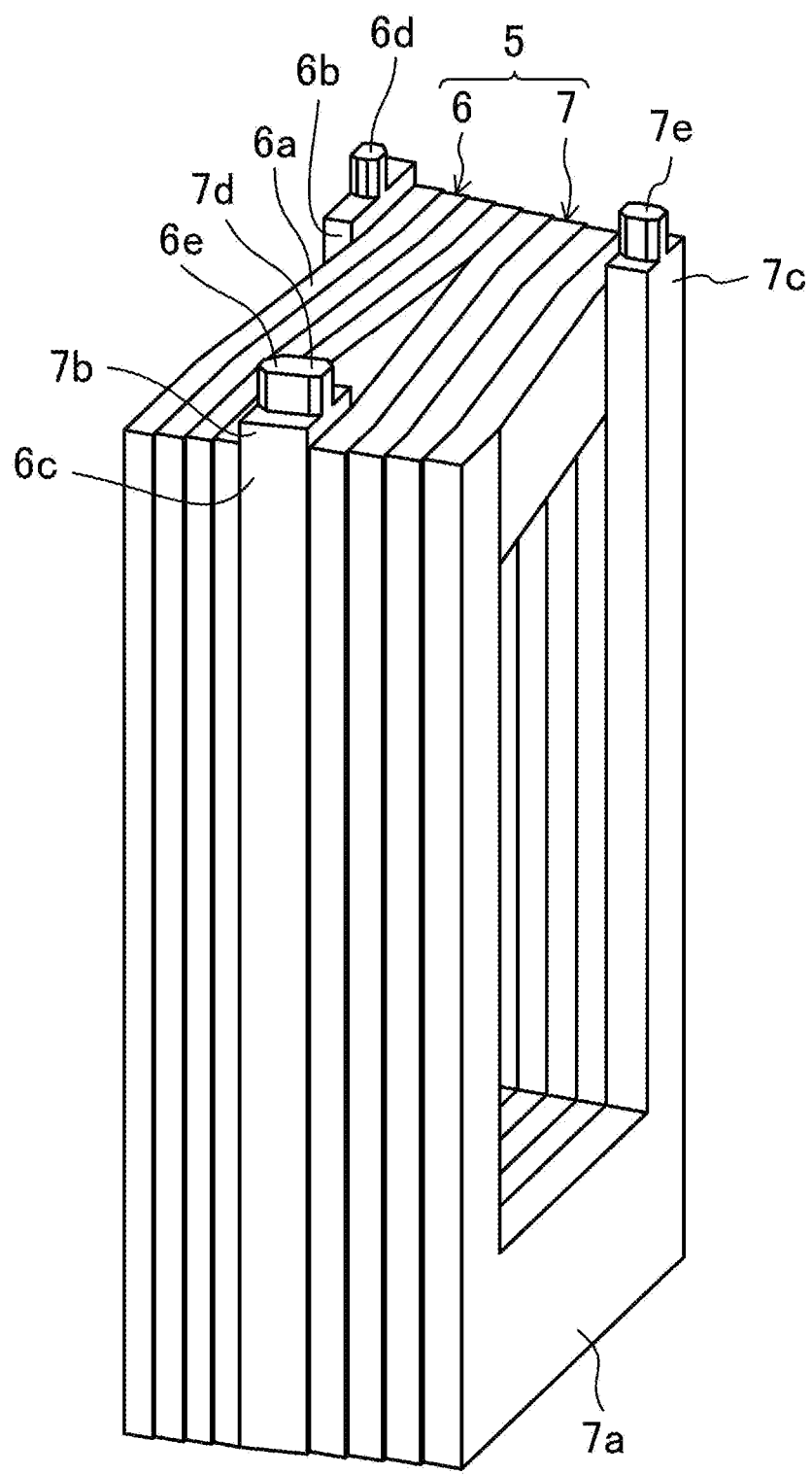
FIG. 3 is a perspective view of the coil set.

As shown in FIG. 3, the coil set 5 includes a first coil 6 and a second coil 7. The first coil 6 has a first coil body 6a. The first coil body 6a has a first end 6b and a second end 6c. The first coil body 6a is shaped by bending a plate-shaped member having a quadrangular cross section and extending in a shape of a strip, in the width direction to form a rectangular shape. A first connecting portion 6d having a width less than that of the first coil body 6a protrudes from an end surface of the first end 6b of the first coil body 6a. A second connecting portion 6e having a width less than that of the first coil body 6a protrudes from an end surface of the second end 6c of the first coil body 6a. The first coil body 6a is spirally wound on the columnar portion 42a along the extending direction of the columnar portion 42a such that the second end 6c is positioned in the protruding direction of the tooth 42 (on one side in the extending direction of the columnar portion 42a) relative to the first end 6b. The winding direction of the first coil body 6a is counterclockwise as viewed from the center of the motor 1. In FIG. 4, the solid-line arrows X indicate the direction of a current flowing on the near side as viewed from the lower side of FIG. 2, the dashed-line arrows X indicate the current flowing on the near side as viewed from the lower side of FIG. 2, and the arrows Y indicate the direction of the magnetic flux. The line width W1 (see FIG. 4) of the first coil body 6a gradually decreases toward the protruding direction of the tooth 42.

On the other hand, the second coil 7 has a second coil body 7a. The second coil body 7a has a third end 7b and a fourth end 7c. The second coil body 7a is shaped by bending a plate-shaped member having a quadrangular cross section and extending in a shape of a strip, in the width direction to form a rectangular shape. A third connecting portion 7d having a width less than that of the second coil body 7a protrudes from an end surface of the third end 7b of the second coil body 7a. A fourth connecting portion 7e having a width less than that of the second coil body 7a protrudes from an end surface of the fourth end 7c of the second coil body 7a. The second coil body 7a is spirally wound on the columnar portion 42a along the extending direction of the columnar portion 42a such that the third end 7b is positioned in the protruding direction of the tooth 42 relative to the second end 6c of the first coil body 6a, and the fourth end 7c is positioned in the protruding direction of the tooth 42 relative to the third end 7b. The winding direction of the second coil body 7a is clockwise as viewed from the center of the motor 1 and is opposite to the winding direction of the first coil body 6a. The plate-shaped member constituting the second coil body 7a has a thickness T2 set to be greater than the thickness T1 of the plate-shaped member constituting the first coil body 6a. The line width W2 of the second coil body 7a is smaller than the line width W1 of the first coil body 6a, and gradually decreases toward the protruding direction of the tooth 42. The number of turns of the second coil body 7a is equal to that of the first coil body 6a. The resistance value of the second coil 7 is greater than that of the first coil 6.

The first connecting portion 6d of the first coil 6 and the fourth connecting portion 7e of the second coil 7 are being integrated by welding with one common bus bar (first conductor) 55 of the bus bars 51 to 53. Thus, the first end 6b of the first coil body 6a and the fourth end 7c of the second coil body 7a are in electrical connection with each other by the bus bar 55. On the other hand, the second connecting portion 6e of the first coil 6 and the second end 6c of the first coil body 6a, and the third connecting portion 7d of the second coil 7 and the third end 7b of the second coil body 7a are being integrated by welding with facing each other. The second end 6c of the first coil body 6a and the third end 7b of the second coil body 7a are being integrated at one side (left side in FIG. 3) extending in the motor rotational shaft direction, among four sides of both coil bodies 6a and 7a. The second connecting portion 6e of the first coil 6 and the third connecting portion 7d of the second coil 7 are being integrated by welding with the bus bar 54 (second conductor). Therefore, the second end 6c of the first coil body 6a, the third end 7b of the second coil body 7a, and the bus bar 54 are integral. Thus, the second end 6c of the first coil body 6a and the third end 7b of the second coil body 7a are in electrical connection with each other by the bus bar 54. In this manner, the second coil 7 is in electrically parallel connection with the first coil 6.

Each of the first and second coils 6 and 7 are comprised of a conductive wire and an insulating coating. The conductive wire is made from, for example, copper, aluminum, zinc, magnesium, brass, iron, SUS, or the like. The insulating coating is provided on the entire surface of the conductive wire except for its both ends. The conductive wire can be manufactured by, for example, punching out each half-turn of the conductive wire from a sheet metal and joining the punched-out wires together by welding or the like. Turns of the first and second coils 6 and 7 are insulated from each other by the insulating coating. The insulating coating is formed from, for example, polyimide, nylon, PEEK, acryl, amide-imide, ester-imide, enamel, or heat-resistant resin. The insulating coating is about several tens of micrometers thick, for example, between 10 μm and 50 μm. Further, the first and second coils 6 and 7 and the stator core 40 are insulated from each other by an insulating coating and an insulating member (not shown) such as a resin or insulating paper.

Therefore, according to the first embodiment, the current can be divided to flow through the first and second coils 6 and 7 that are in electrically parallel connection with each other. This allows the increase in the allowable amount of current flowing between the bus bar 55 and the bus bar 54 without customizing the plate material, as compared to the case in which only one coil is wound on the tooth 42 of the divided core 40a.

The third end 7b of the second coil body 7a, which is in connection with the second end 6c of the first coil body 6a by the bus bar 54, is located closer to the second end 6c in the extending direction than the fourth end 7c. This allows the reduction in the size of the bus bar 54 as compared to the case in which the second end 6c of the first coil body 6a is in connection with the fourth end 7c of the second coil body 7a by the bus bar 54.

The second end 6c of the first coil body 6a, which is in connection with the third end 7b of the second coil body 7a by the bus bar 54, is located closer to the third end 7b in the extending direction than the first end 6b. Thus, the bus bar 54 may be downsized as compared to the case in which the third end 7b of the second coil body 7a is in connection with the first end 6b of the first coil body 6a by the bus bar 54.

The second end 6c of the first coil body 6a and the third end 7b of the second coil body 7a are being integrated. This allows the reduction in the size of the bus bar 54 as compared to the case in which the second end 6c of the first coil body 6a and the third end 7b of the second coil body 7a are spaced apart from each other.

The second end 6c of the first coil body 6a, the third end 7b of the second coil body 7a, and the bus bar 54 are being integrated. This allows prevention of electrical disconnection between the second end 6c of the first coil body 6a, the third end 7b of the second coil body 7a, and the bus bar 54 due to vibrations and the like.

The resistance value of the second coil 7 is set to be greater than that of the first coil 6. This allows the reduction in eddy current flowing through the second coil 7 due to the rotation of the rotor 3 as compared to the case in which the resistance value of the second coil 7 is set to be equal to that of the first coil 6.

(First Variation of First Embodiment)

Figure 5:
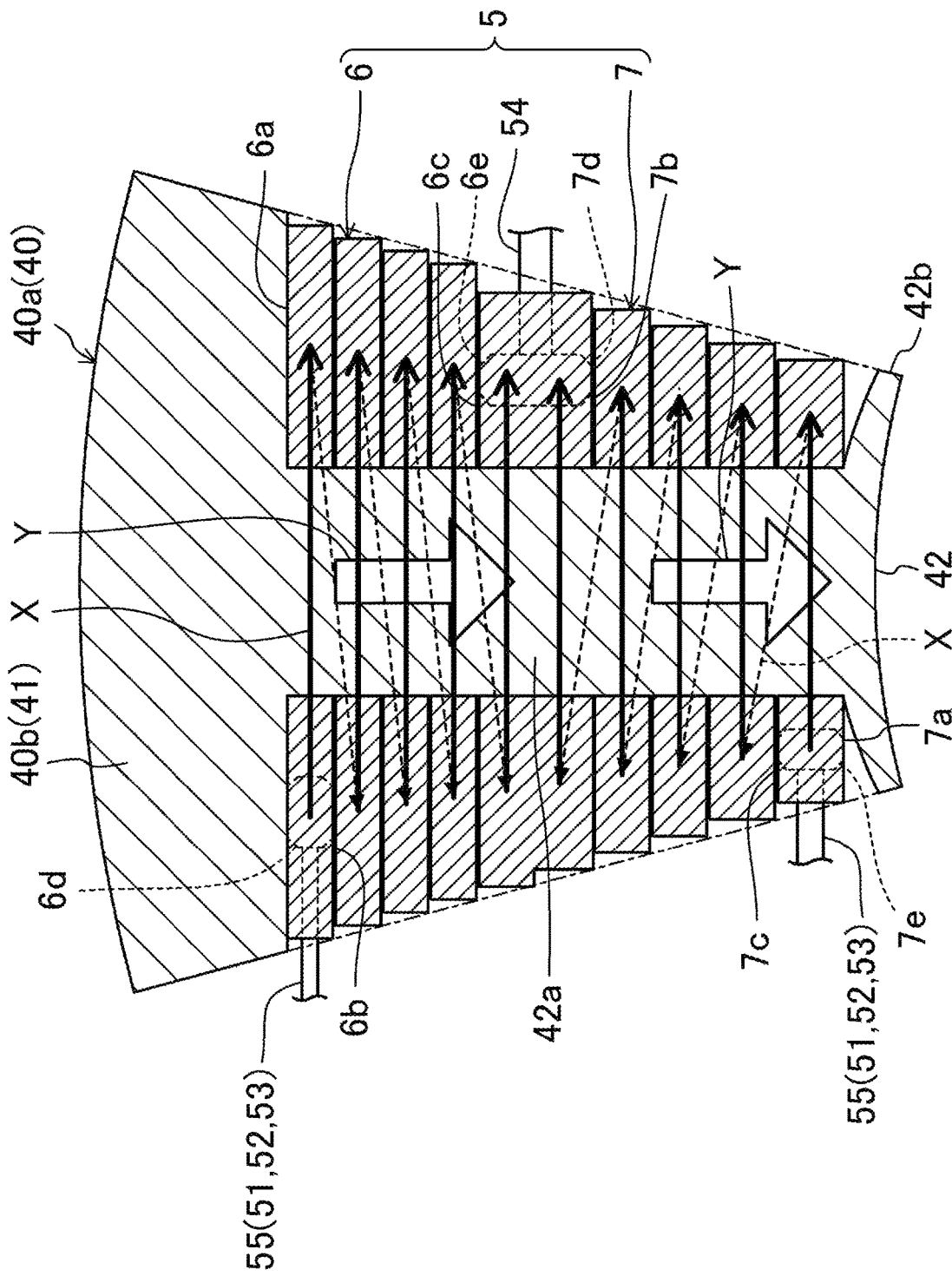
FIG. 5 corresponds to FIG. 4 and illustrates a first variation of the first embodiment.

FIG. 5 corresponds to FIG. 4 and illustrates a first variation of the first embodiment. In the first variation, the second end 6c of the first coil body 6a and the third end 7b of the second coil body 7a are being integrated at three sides excluding one side (upper side in FIG. 3) extending in the motor rotation circumferential direction, among four sides of both coil bodies 6a and 7a.

Since the other configurations are the same as those of the first embodiment, the same components are denoted by the same reference numerals, and detailed description thereof will be omitted.

(Second Variation of First Embodiment)

Figure 6:
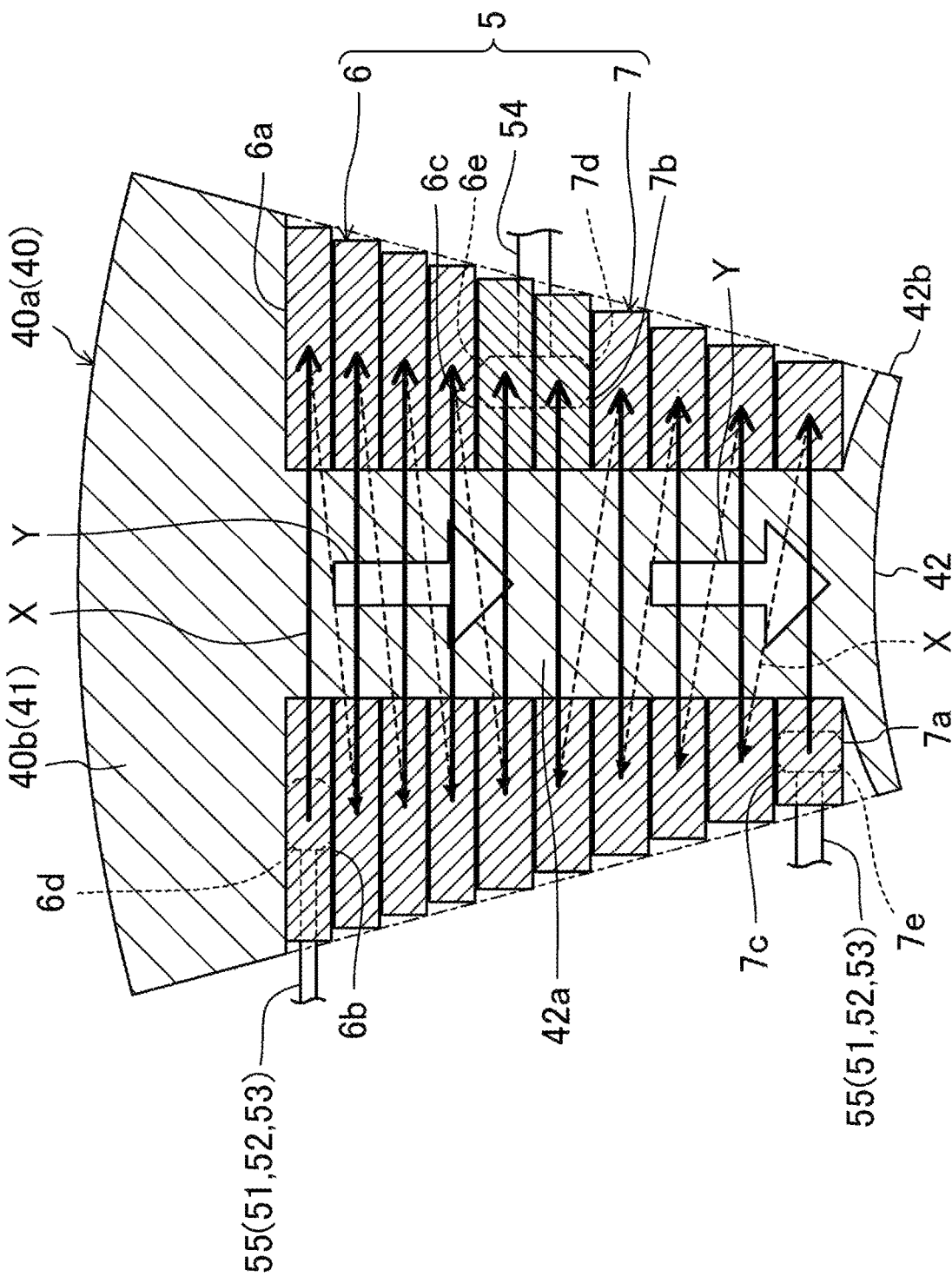
FIG. 6 corresponds to FIG. 4 and illustrates a second variation of the first embodiment.

FIG. 6 corresponds to FIG. 4 and illustrates a second variation of the first embodiment. In the second variation, the second end 6c of the first coil body 6a and the third end 7b of the second coil body 7a are not being integrated, but are in electrical connection with each other by being in contact with each other.

Since the other configurations are the same as those of the first embodiment, the same components are denoted by the same reference numerals, and detailed description thereof will be omitted.

The second variation eliminates the necessary to perform an operation, such as a welding operation, for integrating both ends. Thus, an assembly of the motor 1 is easy as compared to the case in which the second end 6c of the first coil body 6a and the third end 7b of the second coil body 7a are to be integrated.

Second Embodiment

Figure 7:
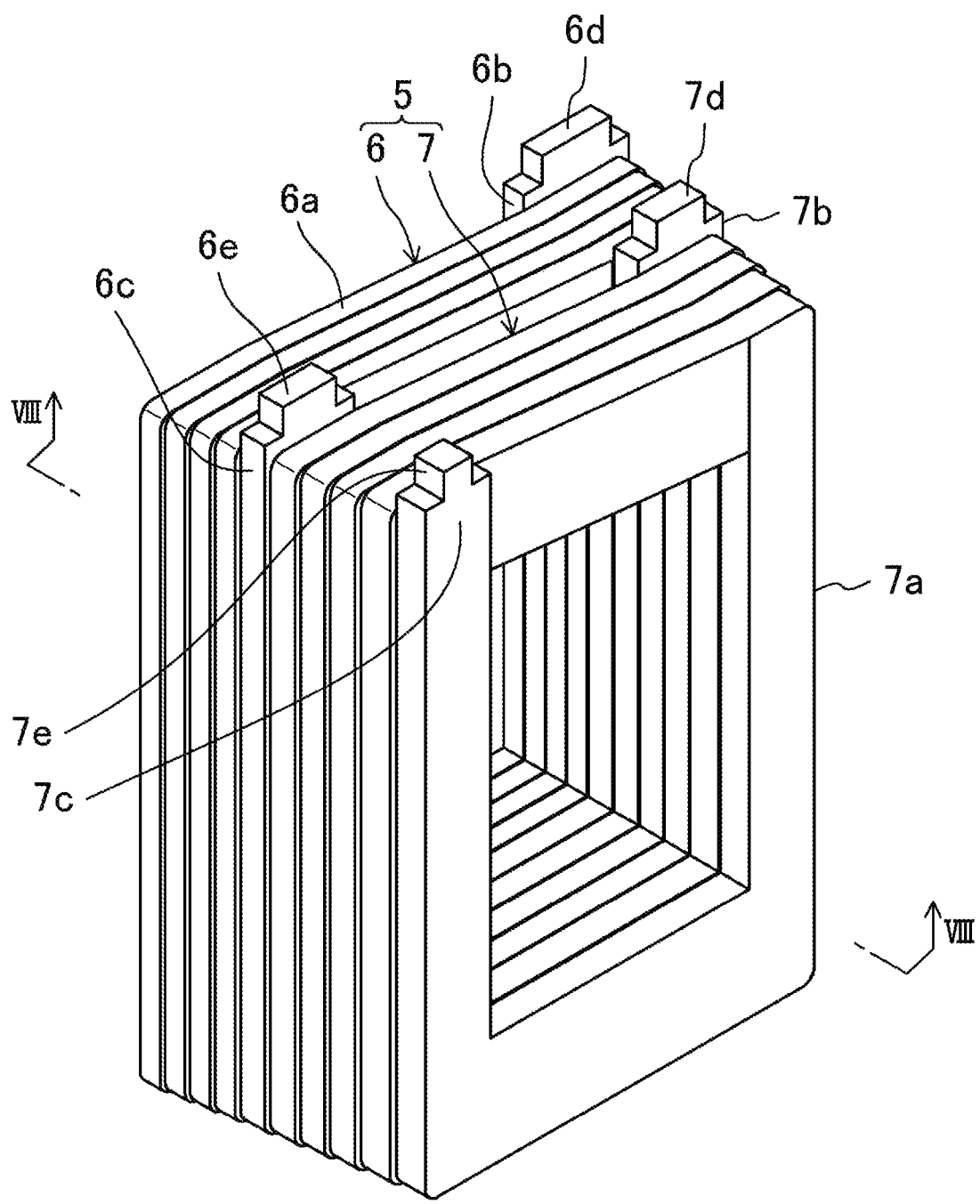
FIG. 7 corresponds to FIG. 3 and illustrates a second embodiment.

FIG. 7 corresponds to FIG. 3 and illustrates a second embodiment. In the second embodiment, as shown in FIG. 8, the winding direction of the second coil body 7a is counterclockwise as viewed from the center of the motor 1, and is the same as the winding direction of the first coil body 6a. The first connecting portion 6d of the first coil 6 and the third connecting portion 7d of the second coil 7 are being integrated by welding with the bus bar 55 (first conductor). Thus, the first end 6b of the first coil body 6a and the third end 7b of the second coil body 7a are in electrical connection with each other by the bus bar 55. Further, the second connecting portion 6e of the first coil 6 and the fourth connecting portion 7e of the second coil 7 are being integrated by welding with the bus bar 54. Thus, the second end 6c of the first coil body 6a and the fourth end 7c of the second coil body 7a are in electrical connection with each other by the bus bar 54.

Since the other configurations are the same as those of the first embodiment, the same components are denoted by the same reference numerals, and detailed description thereof will be omitted.

Third Embodiment

FIG. 9 corresponds to FIG. 4 and illustrates a third embodiment. In the third embodiment, the number of turns of each of the first and second coil bodies 6a and 7a is smaller than that of the first embodiment. The coil set 5 further includes a third coil 8. The third coil 8 has a third coil body 8a. The third coil body 8a has a fifth end 8b and a sixth end 8c. The third coil body 8a is shaped by bending a plate-shaped member having a quadrangular cross section and extending in a shape of a strip, in the width direction to form a rectangular shape. A fifth connecting portion 8d having a width less than that of the third coil body 8a protrudes from an end surface of the fifth end 8b of the third coil body 8a. A sixth connecting portion 8e having a width less than that of the third coil body 8a protrudes from an end surface of the sixth end 8c of the third coil body 8a. The third coil body 8a is spirally wound on the columnar portion 42a along the extending direction of the columnar portion 42a such that the sixth end 8c is positioned in the protruding direction of the tooth 42 (on one side in the extending direction of the columnar portion 42a) relative to the fifth end 8b. The winding direction of the third coil body 8a is counterclockwise as viewed from the center of the motor 1.

The fifth connecting portion 8d and the fifth end 8b of the third coil body 8a, and the fourth connecting portion 7e of the second coil 7 and the fourth end 7c of the second coil body 7a are being integrated by welding with facing each other. Further, the fifth connecting portion 8d and the fourth connecting portion 7e of the second coil 7 are being integrated by welding with the bus bar 55. The sixth connecting portion 8e is being integrated by welding with the bus bar 54. In this manner, the third coil 8 is in electrically parallel connection with the first and second coils 6 and 7.

Since the other configurations are the same as those of the first embodiment, the same components are denoted by the same reference numerals, and detailed description thereof will be omitted.

Fourth Embodiment

FIG. 10 corresponds to FIG. 8 and illustrates a fourth embodiment. In the fourth embodiment, the number of turns of each of the first and second coil bodies 6a and 7a is smaller than that of the second embodiment. The coil set 5 further includes a third coil 8 of the third embodiment. In the fourth embodiment, the fifth connecting portion 8d is being integrated by welding with the bus bar 55. The sixth connecting portion 8e is being integrated by welding with the bus bar 54.

Since the other configurations are the same as those of the second embodiment, the same components are denoted by the same reference numerals, and detailed description thereof will be omitted.

Fifth Embodiment

FIG. 11 corresponds to FIG. 9 and illustrates a fifth embodiment. In the fifth embodiment, the coil set 5 further includes a fourth coil 9. The fourth coil 9 has a fourth coil body 9a. The fourth coil body 9a has a seventh end 9b and an eighth end 9c. The fourth coil body 9a is shaped by bending a plate-shaped member having a quadrangular cross section and extending in a shape of a strip, in the width direction to form a rectangular shape. A seventh connecting portion 9d having a width less than that of the fourth coil body 9a protrudes from an end surface of the seventh end 9b of the fourth coil body 9a. An eighth connecting portion 9e having a width less than that of the fourth coil body 9a protrudes from an end surface of the eighth end 9c of the fourth coil body 9a. The fourth coil body 9a is spirally wound on the columnar portion 42a along the extending direction of the columnar portion 42a such that the eighth end 9c is positioned in the protruding direction of the tooth 42 (on one side in the extending direction of the columnar portion 42a) relative to the seventh end 9b. The winding direction of the fourth coil body 9a is clockwise as viewed from the center of the motor 1.

The seventh connecting portion 9d and the seventh end 9b of the fourth coil body 9a, and the sixth connecting portion 8e of the third coil 8 and the sixth end 8c of the third coil body 8a are being integrated by welding with facing each other. Further, the seventh connecting portion 9d and the sixth connecting portion 8e of the third coil 8 are being integrated by welding with the bus bar 54. The eighth connecting portion 9e is being integrated by welding with the bus bar 55. Thus, the fourth coil 9 is in electrically parallel connection with the first to third coils 6 to 8.

Since the other configurations are the same as those of the third embodiment, the same components are denoted by the same reference numerals, and detailed description thereof will be omitted.

Sixth Embodiment

FIG. 12 corresponds to FIG. 10 and illustrates a sixth embodiment. In the sixth embodiment, the coil set 5 further includes a fourth coil 9 of the fifth embodiment. In the sixth embodiment, the winding direction of the fourth coil 9 is counterclockwise as viewed from the center of the motor 1, and the seventh connecting portion 9d is being integrated by welding with the bus bar 55. The eighth connecting portion 9e is being integrated by welding with the bus bar 54.

Since the other configurations are the same as those of the fourth embodiment, the same components are denoted by the same reference numerals, and detailed description thereof will be omitted.

The coil device of the present disclosure enables an increase in the current-carrying capacity of the coil device, and is therefore useful when applied to a motor, a power device, and the like.

DESCRIPTION OF REFERENCE CHARACTERS

1 Motor (Coil Device)
6 First Coil
6a First Coil Body
6b First End
6c Second End
7 Second Coil
7a Second Coil Body
7b Third End
7c Fourth End
40a Divided Core
40b Divided Yoke
41 Yoke 42 Tooth
42a Columnar Portion
44 Holding Member
54 Bus Bar (Second Conductor)
55 (51 to 53) Bus Bar (First Conductor)

The invention claimed is:

1. A coil device comprising:
a core having a columnar portion extending in a predetermined extending direction;
a first coil including a plate-shaped first coil body having a first end and a second end, the first coil body being spirally wound on the columnar portion of the core along the extending direction such that the second end is positioned on one side in the extending direction relative to the first end;
a second coil including a plate-shaped second coil body having a third end and a fourth end, the second coil body being spirally wound on the columnar portion of the core along the extending direction such that the third end is positioned on the one side in the extending direction relative to the second end of the first coil, and the fourth end is positioned on the one side of the extending direction relative to the third end, the second coil being in electrically parallel connection with the first coil;
a first conductor that electrically connects the first end of the first coil body and the third end of the second coil body; and
a second conductor that electrically connects the second end of the first coil body and the fourth end of the second coil body,
a winding direction of the second coil body being the same as a winding direction of the first coil body.

2. A coil device comprising:
a core having a columnar portion extending in a predetermined extending direction;
a first coil including a plate-shaped first coil body having a first end and a second end, the first coil body being spirally wound on the columnar portion of the core along the extending direction such that the second end is positioned on one side in the extending direction relative to the first end;
a second coil including a plate-shaped second coil body having a third end and a fourth end, the second coil body being spirally wound on the columnar portion of the core along the extending direction such that the third end is positioned on the one side in the extending direction relative to the second end of the first coil, and the fourth end is positioned on the one side of the extending direction relative to the third end, the second coil being in electrically parallel connection with the first coil;
a first conductor that electrically connects the first end of the first coil body and the fourth end of the second coil body; and
a second conductor that electrically connects the second end of the first coil body and the third end of the second coil body,
a winding direction of the second coil body being opposite to a winding direction of the first coil body.

3. The coil device of claim 2, wherein
the second end of the first coil body and the third end of the second coil body are in electrical connection with each other by being in contact with each other with facing each other.

4. The coil device of claim 2, wherein
the second end of the first coil body, the third end of the second coil body, and the second conductor are being integrated.

5. A coil device comprising:
a core having a columnar portion extending in a predetermined extending direction;
a first coil including a plate-shaped first coil body having a first end and a second end, the first coil body being spirally wound on the columnar portion of the core along the extending direction such that the second end is positioned on one side in the extending direction relative to the first end; and
a second coil including a plate-shaped second coil body having a third end and a fourth end, the second coil body being spirally wound on the columnar portion of the core along the extending direction such that the third end is positioned on the one side in the extending direction relative to the second end of the first coil, and the fourth end is positioned on the one side of the extending direction relative to the third end, the second coil being in electrically parallel connection with the first coil;
the core including divided cores that include respective divided yokes constituting a yoke of a stator of a motor, and teeth protruding from respective inner circumferential surfaces of the divided yokes toward a rotation center of the motor, the divided cores being arranged around a rotational shaft of the motor and coupled to each other by fitting a ring-shaped holding member onto outer circumferential sides of the divided yokes,
portions of the teeth excluding end portions constituting the columnar portion of the core,
the one side in the extending direction being a protruding direction of the teeth,
a resistance value of the second coil being greater than a resistance value of the first coil.

* * * * *